US010790695B2

(12) United States Patent
Tong et al.

(10) Patent No.: US 10,790,695 B2
(45) Date of Patent: Sep. 29, 2020

(54) SPLICING DISPLAY SCREEN, METHOD FOR POWERING THE SAME, AND DISPLAY DEVICE

(71) Applicant: BOE Technology Group Co., Ltd., Beijing (CN)

(72) Inventors: Lu Tong, Beijing (CN); Enhui Guan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/419,799

(22) Filed: May 22, 2019

(65) Prior Publication Data

US 2020/0106288 A1    Apr. 2, 2020

(30) Foreign Application Priority Data

Sep. 29, 2018    (CN) .......................... 2018 1 1147886

(51) Int. Cl.
    *G09G 5/00*          (2006.01)
    *H02J 7/02*           (2016.01)
    *H02J 50/80*         (2016.01)
    *H02J 50/10*         (2016.01)
    *H02J 50/40*         (2016.01)
    (Continued)

(52) U.S. Cl.
CPC ............ *H02J 7/025* (2013.01); *G06F 3/1446* (2013.01); *G09F 9/3026* (2013.01); *H02J 50/10* (2016.02); *H02J 50/40* (2016.02); *H02J 50/80* (2016.02)

(58) Field of Classification Search
CPC .... G06F 3/14446; G09G 9/3026; H02J 7/025; H02J 50/10; H02J 50/40; H02J 50/80
See application file for complete search history.

(56) References Cited

U.S. PATENT DOCUMENTS

| 2013/0005252 A1* | 1/2013 | Lee | ....................... H04B 5/0093 |
| | | | 455/41.1 |
| 2014/0111031 A1* | 4/2014 | Lee | .......................... H02J 50/12 |
| | | | 307/149 |
| 2018/0219425 A1 | 8/2018 | Choi | |

FOREIGN PATENT DOCUMENTS

| CN | 205068816 U | 3/2016 |
| CN | 106877447 A | 6/2017 |

(Continued)

OTHER PUBLICATIONS

Office Action for Chinese Application 201811147886.7 dated Dec. 24, 2019.

(Continued)

*Primary Examiner* — Joe H Cheng
(74) *Attorney, Agent, or Firm* — Arent Fox LLP; Michael Fainberg

(57) ABSTRACT

The disclosure relates to a splicing display screen, a method for powering the same, and a display device, and the splicing display screen includes a plurality of display screens, each of which includes: a power supply, a controller and a wireless charging and discharging circuit, where the power supply is configured to power the present display screen, and to provide electric energy to the power supply in another display screen within a first distance; and the wireless charging and discharging circuit is configured to provide electric energy in another display screen to the power supply in the present display screen, to provide electric energy of the power supply in the present display screen to the power supply in another display screen.

14 Claims, 4 Drawing Sheets

(51) Int. Cl.
　　　*G06F 3/14*　　　(2006.01)
　　　*G09F 9/302*　　(2006.01)

(56) References Cited

FOREIGN PATENT DOCUMENTS

| CN | 107678716 A | 2/2018 |
|---|---|---|
| TW | I622076 A | 5/2018 |

OTHER PUBLICATIONS

Energy conversion and equalization technology for series energy storage power supply, Shiyan et al. National Screening Project supported by National Publishing Fund: "National Key Books of the Twelfth Five-Year Plan" Aerospace Science and Engineering Monograph Series, pp. 115-121.

* cited by examiner

SPLICING DISPLAY SCREEN, METHOD FOR POWERING THE SAME, AND DISPLAY DEVICE

CROSS-REFERENCE TO RELATED APPLICATION

This application claims priority of Chinese Patent Application No. 201811147886.7, filed on Sep. 29, 2018, which is hereby incorporated by reference in its entirety.

FIELD

The present disclosure relates to the field of display technologies, and particularly to a splicing display screen, a method for powering the same, and a display device.

BACKGROUND

As the display technologies are advancing constantly, display screens with a large size become increasingly popular, and particularly exhibition display screens, landscape display screens, and advertisement display screens have been widely applied.

Typically a plurality of display screens are spliced into a display screen with a large size, and each of the display screens is arranged with a corresponding battery to power the display screen individually; and in a real application, the individual battery to power the display screen shall be replaced or charged from time to time, but if the electric quantity in some battery becomes abnormal, and the electric quantity in the other batteries are sufficient to power the display screens for displaying an image, then the battery with the abnormal electric quantity will be charged or replaced individually so that the splicing display screen can display the image.

SUMMARY

Some embodiments of the disclosure provide a splicing display screen including a plurality of display screens, each of the splicing display screens includes: a power supply, a controller and a wireless charging and discharging circuit, wherein:

the power supply is configured to power a present display screen, and to provide electric energy to a power supply in another display screen within a first distance; and the wireless charging and discharging circuit is configured to receive electric energy in form of electromagnetic signal in another display screen, and to provide electric energy of the power supply in form of electromagnetic signal in the present display screen to another display screen;

the control circuit is configured, in response to that an electric quantity in the power supply of the present display screen is below a first preset threshold, to send wireless charging requests to another display screen within the first distance, to receive electric quantity feedback from another display screen within the first distance, to determine a target display screen according to the electric quantity feedback and a preset selection strategy, and to send charging control information to the target display screen, and to control the wireless charging and discharging circuit in the present display screen to receive electric energy in form of electromagnetic signal provided by the target display screen to provide the electric energy to the power supply in the present display screen;

in response to that the present display screen receives a charging request sent by another display screen, and the electric quantity in the power supply of the present display screen is above a second preset threshold, to provide electric quantity feedback to the controller in the display screen sending the charging request, and in response to that charging control information is received, to control the wireless charging and discharging circuit in the present display screen to provide electric energy of the power supply in the present display screen in form of electromagnetic signal to the display screen sending the charging request.

In a possible implementation, in the splicing display screen above according to embodiments of the disclosure, the controller includes: an energy patrol circuit, a charging and discharging control circuit, an information receiving circuit, and an information sending circuit, wherein:

the energy patrol circuit is configured to detect in real time the electric quantity of the power supply in the present display screen, and to provide the charging and discharging control circuit with the electric quantity of the power supply;

the information receiving circuit is coupled to the charging and discharging control circuit and configured to receive at least one of the charging request, the charging control information, or the electric quantity feedback sent by another display screen, and to provide the charging and discharging control circuit with at least one of the charging request, the charging control information, or the electric quantity feedback;

the charging and discharging control circuit is coupled to the energy patrol circuit, and configured, in response to that the electric quantity of the power supply in the present display screen is below the first preset threshold, to control the information sending circuit in the present display screen to send the charging request to another display screen within the first distance, to receive the electric quantity feedback from another display screens within the first distance through the information receiving circuit in the present display screen, to determine the target display screen according to the electric quantity feedback and the preset selection strategy, to send the charging control information to the target display screen through the information sending circuit, and to control the wireless charging and discharging circuit in the present display screen to receive electric energy in form of electromagnetic signal provided by the target display screen to provide the electric energy to the power supply in the present display screen; and in response to that the charging request sent by another display screen is received, and the electric quantity in the power supply of the present display screen is above the second preset threshold, to control the information sending circuit in the present display screen to provide the electric quantity feedback to the controller in the display screen sending the charging request, and in response to that the information receiving circuit receives the charging control information, to control the wireless charging and discharging circuit in the present display screen to provide electric energy of the power supply in the present display screen in form of electromagnetic signal to the display screen sending the charging request; and the information sending circuit is coupled to the charging and discharging control circuit and configured to send at least one of the charging requests, the charging control information, or the electric quantity feedback to another display screens within the first distance under the control of the charging and discharging control circuit.

In a possible implementation, in the splicing display screen above according to embodiments of the disclosure, the charging and discharging control circuit includes: a charge receiving circuit, a charge transmitting circuit, and a charge transmitting and receiving control circuit, wherein:

the charge transmitting and receiving control circuit is configured, in response to that the charging request provided by the information receiving circuit is received, and the electric quantity of the power supply in the present display screen is above the second preset threshold, to provide the electric quantity feedback to the display screen sending the charging request, and upon reception of the charging control information, to control the charge transmitting circuit in the present display screen to convert electric energy of the power supply in the present display screen to electromagnetic signal and provide the electromagnetic signal to the wireless charging and discharging circuit in the present display screen; and in response to that the electric quantity of the power supply in the present display screen is below the first preset threshold, to control the charge transmitting circuit in the present display screen to send the charging requests to another display screen within the first distance, to receive the electric quantity feedback from another display screens within the first distance, to determine the target display screen according to the electric quantity feedback and the preset selection strategy, to send the charging control information to the target display screen, and to control the charge receiving circuit in the present display screen to convert electromagnetic signal of the target display screen received by the wireless charging and discharging circuit in the present display screen to the electric energy to provide the electric energy to the power supply in the present display screen;

the charge receiving circuit is coupled to the charge transmitting and receiving control circuit and configured to convert the electromagnetic signal received by the wireless charging and discharging circuit to electric signal and provide the electric signal to the power supply in the present display screen, under the control of the charge transmitting and receiving control circuit; and the charge transmitting circuit is coupled to the charge transmitting and receiving control circuit and configured to convert electric signal of the power supply in the present display screen to electromagnetic signal and provide the electromagnetic signal to the wireless charging and discharging circuit under the control of the charge transmitting and receiving control circuit.

In a possible implementation, in the splicing display screen above according to embodiments of the disclosure, the preset selection strategy includes the preset selection strategy comprises determining a display screen of a largest electric quantity as the target display screen within the display screens providing the electric quantity feedback, according to the electric quantity feedback.

In a possible implementation, in the splicing display screen above according to the embodiment of the disclosure, the charging and discharging control circuit further includes a charging and discharging selecting circuit, wherein:

the charging and discharging selecting circuit is coupled to the energy patrol circuit, the charge receiving control circuit, and the charge transmitting circuit, and configured to set the power supply in a charging mode while the charge receiving circuit is operating, and to set the power supply in a discharging mode while the charge transmitting circuit is operating.

In a possible implementation, in the splicing display screen above according to embodiments of the disclosure, both the information receiving circuit and the information sending circuit include a wireless communication circuit.

In a possible implementation, in the splicing display screen above according to embodiments of the disclosure, the wireless charging and discharging circuit includes a plurality of transmitting and receiving coils located in a bezel of the display screen, and arranged corresponding to the transmitting and receiving coils in another display screen; and the controller controls the transmitting and receiving coils to provide electromagnetic signal to corresponding display screens, or the controller controls the transmitting and receiving coils to receive electromagnetic signal provided by corresponding display screens.

In a possible implementation, in the splicing display screen above according to embodiments of the disclosure, the display screen further includes a coil selecting circuit, wherein:

the coil selecting circuit is coupled to the charge transmitting and receiving control circuit and configured to determine a transmitting and receiving coil for providing electromagnetic signal to the display screen sending the charging request, under the control of the charge transmitting and receiving control circuit, and to determine a transmitting and receiving coil to receive electromagnetic signal provided by another display screen, under the control of the charge transmitting and receiving control circuit.

In a possible implementation, in the splicing display screen above according to embodiments of the disclosure, the splicing display screen includes a plurality of charge transmitting circuits, and a plurality of charge receiving circuits, and each transmitting and receiving coil is arranged corresponding respectively to one of the charge transmitting circuits, and one of the charge receiving circuits.

In a possible implementation, in the splicing display screen above according to embodiments of the disclosure, the transmitting and receiving coils include inductive coils.

In a possible implementation, in the splicing display screen above according to embodiments of the disclosure, the first distance is less than 5 mm.

In another aspect, some embodiments of the disclosure further provide a display device including the splicing display screen according to any one of the embodiments above.

In another aspect, some embodiments of the disclosure further provide a method for powering the splicing display screen according to any one of the embodiments above, the method including:

in response to that the electric quantity of the power supply in the present display screen is below a first preset threshold, sending, by the controller, a wireless charging request to another display screen within the first distance, receiving electric quantity feedback from another display screen within the first distance, determining a target display screen according to the electric quantity feedback and the preset selection strategy, and sending charging control information to the target display screen to control the wireless charging and discharging circuit to receive electric energy provided by the target display screen in form of electromagnetic signal to provide the electric energy to the power supply in the present display screen; and in response to that the present display screen receives a charging request sent by another display screen, and the electric quantity in the power supply in the present display screen is above a second preset threshold, providing electric quantity feedback to the controller in the display screen sending the charging request, and in response to that charging control information is received, controlling the wireless charging and discharging circuit in the present display screen to provide electric energy of the power supply in the present display screen in form of electromagnetic signal to the power supply in the display screen sending the charging request.

In a possible implementation, in the method above according to embodiments of the disclosure, the determining a target display screen according to the electric quantity feedback and the preset selection strategy includes:

determining a display screen of a largest electric quantity as the target display screen within the display screens providing the electric quantity feedback, according to the electric quantity feedback.

In a possible implementation, in the method above according to embodiments of the disclosure, the determining a target display screen according to the electric quantity feedback and the preset selection strategy includes:

determining a display screen of a largest electric quantity as the target display screen within the display screens providing the electric quantity feedback and having a same distance from the present display screen, according to the electric quantity feedback.

In a possible implementation, in the method above according to embodiments of the disclosure, the determining a target display screen according to the electric quantity feedback and the preset selection strategy includes:

determining a display screen closet to the present display screen as the target display screen within the display screens providing the electric quantity feedback and having same energy quantity, according to the electric quantity feedback.

DETAILED DESCRIPTION OF THE EMBODIMENTS

Figure 1:
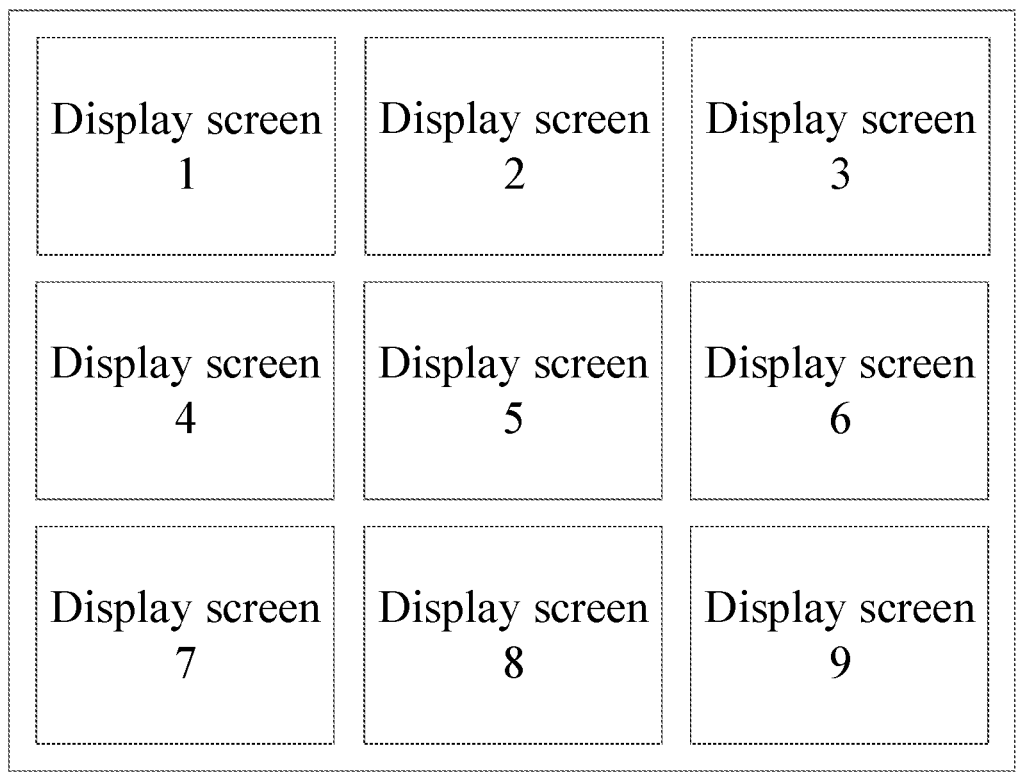
FIG. 1 is a schematic structural diagram of a splicing display screen according to some embodiments of the disclosure.

In view of the problem in the related art of replacing or charging in a splicing display screen frequently, the embodiments of the disclosure provide a splicing display screen, a method for powering the same, and a display device. In order to make the objects, the technical solutions, and the advantages of the disclosure more apparent, the disclosure will be described below in further details with reference to the drawings, and apparently the embodiments to be described are only a part but not all of the embodiments of the disclosure. Based upon the embodiments here of the disclosure, all the other embodiments which can occur to those ordinarily skilled in the art without any inventive effort shall fall into the claimed scope of the disclosure.

The shapes and the sizes of respective components in the drawings are not intended to reflect any real proportion, but only intended to illustrate the disclosure of the disclosure.

Figure 2:
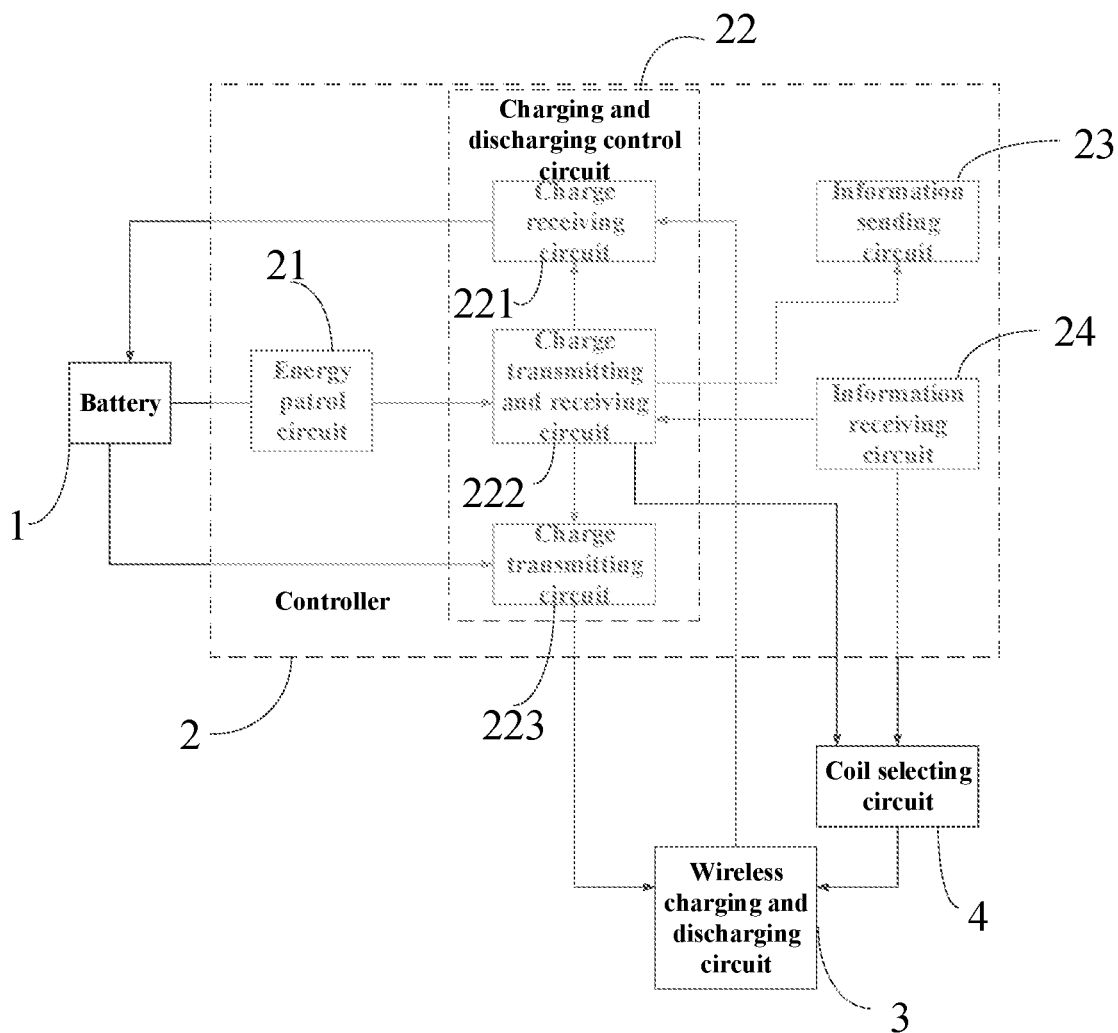
FIG. 2 is a schematic structural diagram of a powering system in the splicing display screen according to some embodiments of the disclosure.

Optionally, as illustrated in FIG. 1 and FIG. 2, a splicing display screen according to some embodiments of the disclosure include a plurality of display screens, each of which includes: a battery 1 and a wireless charging and discharging circuit 3. Optionally, the battery 1 may be replaced with any power supply of power storage performance.

The battery 1 is configured to power the present display screen, and to provide electric energy to the battery 1 in another display screen within a first distance; optionally, the first distance is less than 5 mm.

The wireless charging and discharging circuit 3 is configured to provide electric energy in another display screen to the battery 1 in the present display screen, and to provide electric energy of the battery 1 in the present display screen to the battery 1 in another display screen. In an optional implementation, the wireless charging and discharging circuit 3 receives electric energy of electromagnetic signal form in the battery 1 of another display screen, and provides electric energy of electromagnetic signal form in the battery 1 of the present display screen to anther display screen.

The splicing display screen according to embodiments of the disclosure includes a plurality of display screens, each of which includes: a battery and a wireless charging and discharging circuit, where the battery is configured to power the present display screen, and to provide electric energy to the battery in another display screen within a first distance; and the wireless charging and discharging circuit is configured to provide electric energy in another display screen to the battery in the present display screen, and to provide electric energy of the battery in the present display screen to the battery in another display screen, so that the batteries within the first distance from each other can provide each other with electric energy, that is, the respective screen within the first distance can share their electric energy with each other, thus reducing the number of times that the battery is charged or replaced, and facilitating maintenance of the splicing display screen.

Optionally, in the splicing display screen according to embodiments above of the disclosure, as illustrated in FIG. 1 and FIG. 2, each display screen further includes a controller 2, optionally, the controller 2 is an IDT wireless charging control chip.

The controller 2 is configured, when the electric quantity in the battery 1 in the present display screen is below a first preset threshold, to send wireless charging requests to the other display screens within the first distance, to receive electric quantity feedback from the other display screens within the first distance, to determine a target display screen according to the electric quantity feedback and a preset selection strategy, to send charging control information to the target display screen, and to control the wireless charging and discharging circuit 3 in the present display screen to receive electric energy provided by the target display screen to provide the electric energy to the battery 1 in the present display screen.

Optionally, in the splicing display screen according to embodiments above of the disclosure, the controller 2 is further configured, when the present display screen receives a charging request sent by another display screen, and the electric quantity in the battery 1 in the present display screen is above a second preset threshold, to provide electric quantity feedback to the controller 2 in the display screen sending the charging request, and when charging control information is received, to control the wireless charging and discharging circuit 3 in the present display screen to provide electric energy of the battery 1 in the present display screen to the battery 1 in the display screen sending the charging request.

Optionally, in the splicing display screen according to embodiments above of the disclosure, FIG. 1 illustrates the splicing display screen into which nine display screens arranged in an array are spliced, but embodiments of the disclosure will not be limited to any particular number and arrangement pattern of the display screens in the splicing display screen, and the shape of the splicing display screen, and for example, the splicing display screen can be an abnormally-shaped splicing display screen including a plurality of display screens (the number of which is optionally, set according to the size of the splicing display screen), and the respective display screens in the splicing display screen may or may not be arranged regularly, although embodiments of the disclosure will not be limited thereto.

It shall be noted that in the splicing display screen according to the embodiment above of the disclosure, the batteries in the respective display screens can power the batteries in the other display screens within the first distance, and optionally the batteries in their immediately adjacent display screens; and as illustrated in FIG. 1, for example, when the electric quantity in the display screen 5 is below the first threshold, the display screen 5 optionally sends charging requests to the display screen 2, the display screen 6, the display screen 8, and the display screen 4 for the best charging effect, that is, such one of the display screen 2, the display screen 6, the display screen 8, and the display screen 4 that has the largest electric quantity powers the battery in the display screen 5. Of course, when none of the display screen 2, the display screen 6, the display screen 8, and the display screen 4 satisfies a condition for powering the battery in the display screen 5, the display screen 5 can alternatively send a charging request to, and accept electric energy from, a display screen at a longer distance. The particular range of the first distance can be set as needed in reality, although embodiments of the disclosure will not be limited thereto.

It shall be noted that in the splicing display screen according to embodiments above of the disclosure, when the electric quantity of the battery in the present display screen is below the first preset threshold, the wireless charging requests are sent to the other display screens within the first distance, the display screens receiving the charging requests determine whether the electric quantity of their batteries are above the second preset threshold, and if so, then the electric quantity feedback will be sent to the display screen sending the charging requests; otherwise, no electric quantity feedback will sent to the display screen sending the charging requests, so that the electric quantity of their batteries can satisfy their own demands, where the first preset threshold is far below the second threshold, that is, if the battery in the display screen can satisfy its own demand, then the display screen will not send any charging requests to the other display screens.

Here all of the charging requests, the electric quantity feedback, and the charging control information include the identifier or identifiers of the information sending display screen and/or the information receiving display screens.

Optionally, in the splicing display screen according to embodiments above of the disclosure, as illustrated in FIG. 2, the controller 2 includes: an energy patrol circuit 21, a charging and discharging control circuit 22, an information receiving circuit 24, and an information sending circuit 23.

The energy patrol circuit 21 is configured to detect in real time the electric quantity of the battery 1 in the present display screen, and to provide the charging and discharging control circuit 22 with the electric quantity of the battery 1.

The information receiving circuit 24 is coupled to the charging and discharging control circuit 22, and configured to receive at least one of the charging request, the charging control information, or the electric quantity feedback sent by the other display screen, and to provide the charging and discharging control circuit 22 with at least one of the charging request, the charging control information, or the electric quantity feedback.

The charging and discharging control circuit 22 is coupled to the energy patrol circuit 21, and configured, when the electric quantity of the battery 1 in the present display screen is below the first preset threshold, to control the information sending circuit 23 in the present display screen to send the charging request to the other display screens within the first distance, to receive the electric quantity feedback from the other display screens within the first distance through the information receiving circuit 24 in the present display screen, to determine the target display screen according to the electric quantity feedback and the preset selection strategy, to send the charging control information to the target display screen through the information sending circuit 23, and to control the wireless charging and discharging circuit 3 in the present display screen to receive electric energy provided by the target display screen to provide the electric energy to the battery 1 in the present display screen; and when the charging request sent by the other display screen is received, and the electric quantity in the battery 1 in the present display screen is above the second preset threshold, to control the information sending circuit 23 in the present display screen to provide the electric quantity feedback to the display screen sending the charging request, and when the information receiving circuit 24 receives the charging control information, to control the wireless charging and discharging circuit 3 in the present display screen to provide electric energy of the battery 1 in the present display screen to the battery 1 in the display screen sending the charging request.

The information sending circuit 23 is coupled to the charging and discharging control circuit 22 and configured to send at least one of the charging requests, the charging control information, or the electric quantity feedback to the other display screens within the first distance under the control of the charging and discharging control circuit 22.

Optionally, in the splicing display screen according to embodiments above of the disclosure, the charging and discharging control circuit controls the control information receiving circuit, and the information sending circuit to exchange information with the other display screens, and when the electric quantity in the present display screen is below the first preset threshold, the display screen with the largest electric quantity within the first distance is selected to power the present display screen; and when the electric quantity in the present display screen is the largest within the first distance, the present display screen can power one of the display screens with the electric quantity below the first preset threshold within the first distance. It shall be noted that while the first display screen is powering the second display screen, even if the third display screen sends a charging request to the first display screen, then the first display screen will not provide the third display screen with any electric quantity feedback, that is, while the first display screen is powering the second display screen, the first display screen will not charge the third display screen.

Optionally, in the splicing display screen according to embodiments above of the disclosure, as illustrated in FIG. 2, the charging and discharging control circuit 22 includes: a charge receiving circuit 221, a charge transmitting circuit 223, and a charge transmitting and receiving control circuit 222.

The charge transmitting and receiving control circuit 222 is configured, when the charging request provided by the information receiving circuit 24 is received, and the electric quantity of the battery 1 in the present display screen is above the second preset threshold, to provide the electric quantity feedback to the display screen sending the charging request, and upon reception of the charging control information, to control the charge transmitting circuit 223 in the present display screen to convert the electric signal of the battery 1 in the present display screen to the electromagnetic signal and provide the electromagnetic signal to the wireless charging and discharging circuit 3 in the present display screen; and when the electric quantity of the battery 1 in the present display screen is below the first preset threshold, to control the charge transmitting circuit 223 in the present display screen to send the charging requests to the other display screens within the first distance, to receive the electric quantity feedback from the other display screens within the first distance, to determine the target display screen according to the electric quantity feedback and the preset selection strategy, to send the charging control information to the target display screen, and to control the charge receiving circuit 221 in the present display screen to convert electromagnetic signal of the target display screen received by the wireless charging and discharging circuit 3 in the present display screen to the electric signal and provide the electric signal to the battery 1 in the present display screen.

The charge receiving circuit 221 is coupled to the transmitting and receiving control circuit 222 and configured to convert the electromagnetic signal received by the wireless charging and discharging circuit 3 to the electric signal and provide the electric signal to the battery 1 in the present display screen, under the control of the charge transmitting and receiving control circuit 222.

The charge transmitting circuit 223 is coupled to transmitting and receiving control circuit 222 and configured to convert the electromagnetic signal of the battery 1 in the present display screen to the electric signal and provide the electric signal to the wireless charging and discharging circuit 3 under the control of the charge transmitting and receiving control circuit 222.

Optionally, in the splicing display screen according to embodiments above of the disclosure, when the present display screen receives the charging control information sent by the display screen sending the charging request, the charge transmitting and receiving control circuit controls the charge transmitting circuit to provide the electric energy of the battery in the present display screen to the battery in the display screen sending the charging request; and when the present display screen needs electric energy, the charge transmitting and receiving circuit in the present display screen sends the charging control information to the other display screen, and also controls the charge receiving circuit corresponding to the other display screen to operate to provide the electric energy received by the wireless charging and discharging circuit in the present display screen to the battery in the present display screen.

Optionally, in the splicing display screen according to embodiments above of the disclosure, the preset selection strategy includes determining such one of the display screens providing the electric quantity feedback that has the largest electric quantity, according to the electric quantity feedback.

Of course, all the display screens which can provide the present display screen with the electric quantity feedback can power the present display screen, and when they have the same distance from the present display screen, such one of them that has the largest electric quantity can be selected to power the present display screen; and when they have the same electric quantity, such one of them has the shortest distance can be selected to power the present display screen, optionally, as needed in reality, although embodiments of the disclosure will not be limited thereto.

Optionally, in the splicing display screen according to embodiments above of the disclosure, the charging and discharging control circuit further includes a charging and discharging selecting circuit.

The charging and discharging selecting circuit is coupled to the energy patrol circuit, the charge receiving circuit and the charge transmitting circuit, and configured to set the battery in a charging mode while the charge receiving circuit is operating, and to set the battery in a discharging mode while the charge transmitting circuit is operating.

It shall be noted that the charging and discharging selecting circuit is configured to control an operating mode of the battery so that it sets the battery of the present display screen in the charging mode while the present display screen is being powered by another display screen, and sets the battery of the present display screen in the discharging mode while the present display screen is powering another display screen. Of course, the discharging mode refers to powering the other display screen instead of powering the present display screen for displaying, and the respective display screens can display normally while the present display screen is powering the other display screen, or the other display screen is powering the present display screen.

Optionally, in the splicing display screen according to embodiments above of the disclosure, both the information receiving circuit and the information sending circuit include wireless communication circuits. Optionally, the respective display screen can exchange information through Bluetooth, Wi-Fi, etc., or of course, they can communicate otherwise, although embodiments of the disclosure will not be limited thereto.

Figure 3:
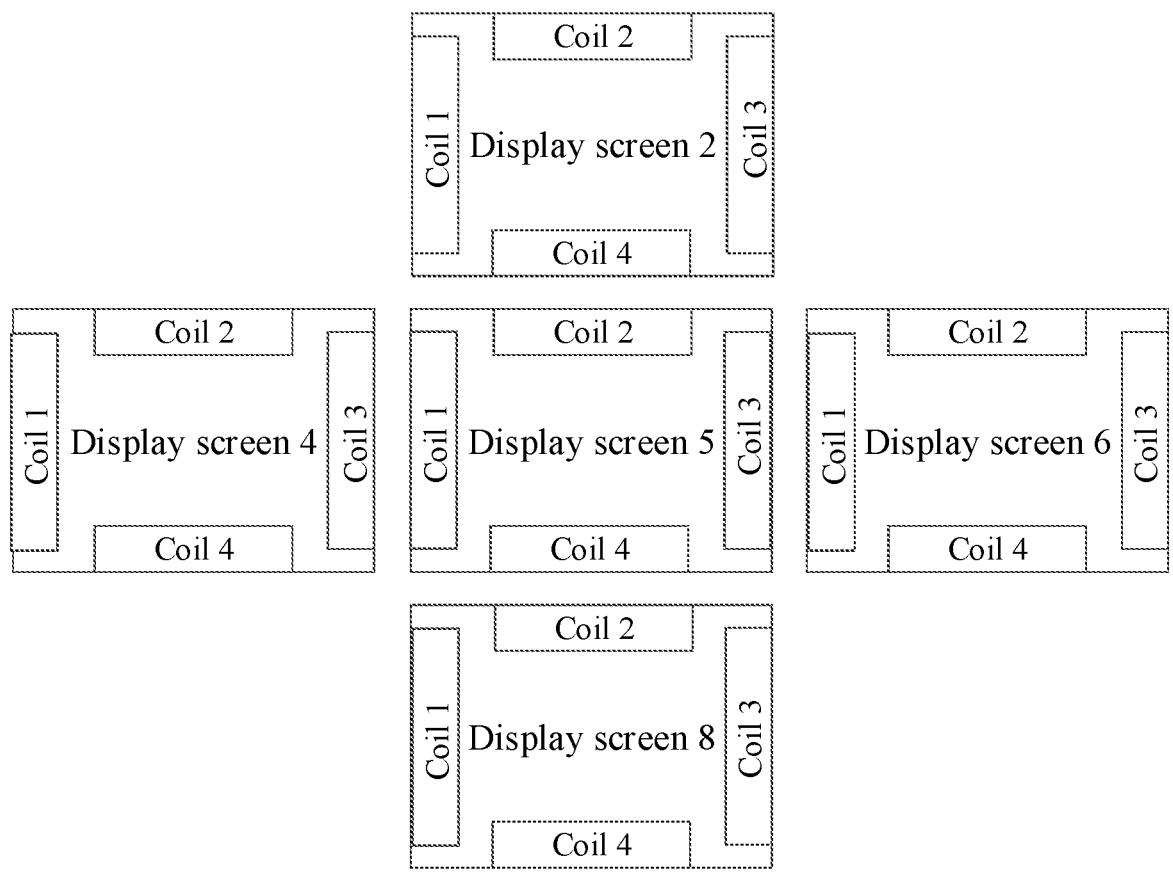
FIG. 3 is a principle diagram of matching transmitting and receiving coils in the splicing display screen according to some embodiments of the disclosure.

Optionally, in the splicing display screen according to embodiments above of the disclosure, as illustrated in FIG. 3, the wireless charging and discharging circuit includes a plurality of transmitting and receiving coils located in a bezel of the display screen, and arranged corresponding to the transmitting and receiving coils in the other display screens.

The controller controls the respective transmitting and receiving coils to provide the electromagnetic signal to the batteries in their corresponding display screens, or the controller controls the respective transmitting and receiving coils to receive the electromagnetic signal provided by their corresponding display screens.

Optionally, in the splicing display screen according to embodiments above of the disclosure, as illustrated in FIG. 3, the respective display screen includes four transmitting and receiving coils, where the transmitting and receiving coil 1 in each display screen is arranged corresponding to the transmitting and receiving coils 3 in the other display screens, and the transmitting and receiving coil 2 in each display screen is arranged corresponding to the transmitting and receiving coils 4 in the other display screens; and in a charging and discharging process, the corresponding coils are coupled with each other so that the charging coil in the display screen sending the charging request produces electric energy to power the corresponding battery. It shall be noted that in the splicing display screen according to embodiments above of the disclosure, the positions and the numbers of transmitting and receiving coils in the respective display screens have been described as illustrated in FIG. 3 by way of an example, but the positions and the numbers of transmitting and receiving coils in the display screens will not be limited thereto, and there will also be other reasonable arrangement patterns and numbers of transmitting and receiving coils without departing from the scope of the disclosure.

Optionally, in the splicing display screen according to the embodiment above of the disclosure, as illustrated in FIG. 2 and FIG. 3, each display screen further includes a coil selecting circuit 4.

The coil selecting circuit 4 is coupled to the charging and discharging control circuit 22, and configured to determine a transmitting and receiving coil for providing electromagnetic signal to the display screen sending the charging request, under the control of the charge transmitting and receiving control circuit 222, and to determine a transmitting and receiving coil to receive electromagnetic signal provided by the other display screen, under the control of the charge transmitting and receiving control circuit 222.

It shall be noted that in the splicing display screen according to the embodiment above of the disclosure, all of the charging request, the electric quantity feedback, and the charging control information include the identifier of the display screen sending the information, and the charge transmitting and receiving control circuits in the respective display screens can control the coil selecting circuit to select the corresponding transmitting and receiving coil for charging and discharging according to a pre-stored correspondence relationship between the identifier and the transmitting and receiving coil.

Optionally, in the splicing display screen according to embodiments above of the disclosure, the splicing display screen includes a plurality of charge transmitting circuits, and a plurality of charge receiving circuits, and each transmitting and receiving coil is arranged corresponding respectively to one of the charge transmitting circuits, and one of the charge receiving circuits.

In the connection mode above, the charge transmitting and receiving control circuit can provide the electric energy of the battery to a corresponding transmitting and receiving coil, or provide the battery with electric energy produced by the transmitting and receiving coil, only by controlling a corresponding charge transmitting circuit or charge receiving circuit.

Optionally, in the splicing display screen according to embodiments above of the disclosure, each transmitting and receiving coil includes an inductive coil.

An example of embodiments of the disclosure will be described below.

Figure 4:
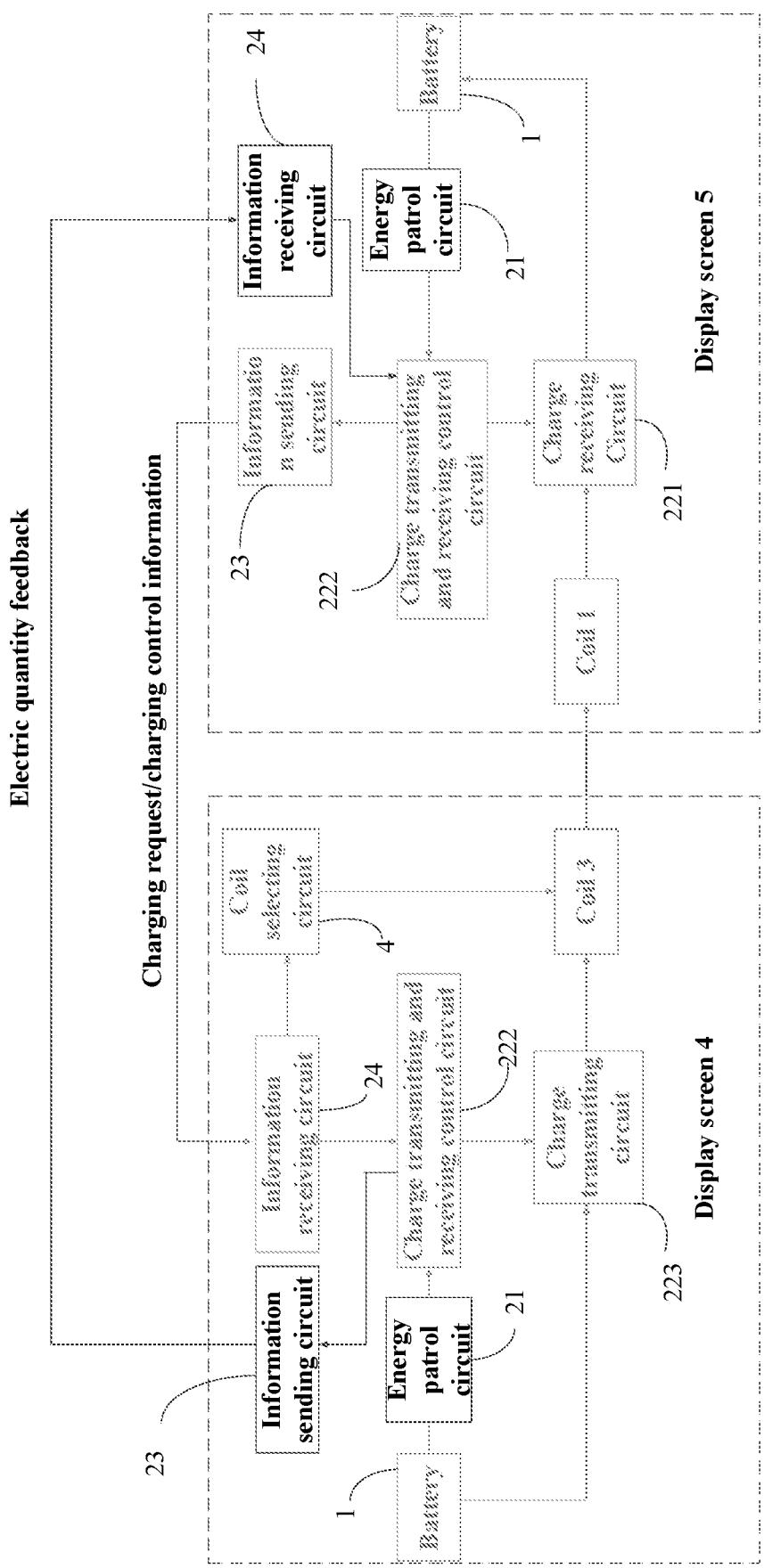
FIG. 4 is a principle diagram of display screens powering each other according to some embodiments of the disclosure.

Interaction between the respective display screens will be described below with reference to FIG. 3 and FIG. 4, for example, where the electric quantity of the battery in the display screen 5 is below the first preset threshold, and the electric quantity of the batteries in the display screen 2, the display screen 4, and the display screen 6 are above the second preset threshold, but the electric quantity in the display screen 4 is the largest, and the electric quantity in the display screen 8 is above the first preset threshold, and below the second preset threshold, for example.

The energy patrol circuit 21 provides the charge transmitting and receiving control circuit 222 in real time with the electric quantity of the battery in the display screen 5 below the first preset threshold, the charge transmitting and receiving control circuit 222 in the display screen 5 controls the information sending circuit 23 in the display screen 5 to send charging requests to the information receiving circuits 24 in the display screen 2, the display screen 4, the display screen 6, and the display screen 8, the charge transmitting and receiving control circuit 222 in the display screen 2, the display screen 4, the display screen 6, and the display screen 8 send electric quantity feedback to the information receiving circuit 24 in the display screen 5 according to the electric quantity in the respective display screens, and the charge transmitting and receiving control circuit 222 in the display screen 5 processes the received electric quantity feedback, and determines that the electric quantity of the battery 1 in the display screen 4 is the largest, so the charge transmitting and receiving control circuit 222 in the display screen 5 controls the information sending circuit 23 in the display screen 5 to send charging control information to the information receiving circuit 24 in the display screen 4, and upon reception of the charging control information, the display screen 4 controls the charge transmitting circuit 223 in the display screen 4 to provide electric energy of the battery 1 in form of the electromagnetic signal in the display screen 4 to the transmitting and receiving coil 1 in the display screen 5 through the transmitting and receiving coil 3, and the charge transmitting and receiving control circuit 222 in the display screen 5 controls the charge receiving circuit 221 in the display screen 5 to convert the electromagnetic signal produced by the transmitting and receiving coil in the display screen 5 to the electric signal and provide the electric signal to the battery 1 in the display screen 5, thus performing a charging and discharging interaction process.

Based upon the same inventive idea, some embodiments of the disclosure further provide a method for powering the splicing display screen, where the method includes:

when the electric quantity of the battery in the present display screen is below a first preset threshold, a controller sends a wireless charging request to the other display screens within the first distance, receives electric quantity feedback from the other display screens within the first distance, determines a target display screen according to the electric quantity feedback and a preset selection strategy, and sends charging control information to the target display screen to control the wireless charging and discharging circuit to receive electric energy in form of the electromagnetic signal provided by the target display screen to provide the electric energy to the battery in the present display screen; and when the present display screen receives a charging request sent by another display screen, and the electric quantity in the battery 1 in the present display screen is above a second preset threshold, the controller provides electric quantity feedback to the controller in the display screen sending the charging request, and when charging control information is received, the controller controls the wireless charging and discharging circuit in the present display screen to provide electric energy of the battery 1 in the present display screen in form of the electromagnetic signal to the battery 1 in the display screen sending the charging request.

Here an implementation of the method above for powering the splicing display screen has been described in details in embodiments of the splicing display screen, so reference can be made to embodiments of the splicing display screen for an implementation of the method for powering the splicing display screen, and a repeated description thereof will be omitted here.

Based upon the same inventive idea, some embodiments of the disclosure further provide a display device including the splicing display screen according to embodiments above. Since the display device addresses the problem under a similar principle to the splicing display screen above, reference can be made to the implementation of the splicing display screen above for an implementation of the display device, and a repeated description thereof will be omitted here.

Here the display device can be applicable to a large exhibition hall, a meeting room, an advertisement space on a building, or any other scenario in which a splicing display screen with a large size is required, although embodiments of the disclosure will not be limited thereto.

In the splicing display screen, the method for powering the same, and the display device according to embodiments of the disclosure, the splicing display screen includes a plurality of display screen, each of which includes: a battery and a wireless charging and discharging circuit, where the battery is configured to power the present display screen, and to provide electric energy to the battery in another display screen within a first distance; and the wireless charging and discharging circuit is configured to provide electric energy in another display screen to the battery in the present display screen, to provide electric energy of the battery in the present display screen to the battery in another display screen, so that the batteries within the first distance from each other can provide each other with electric energy, that is, the respective screen within the first distance can share their electric energy with each other, thus reducing the number of times that the battery is charged or replaced, and facilitating maintenance of the splicing display screen.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A splicing display screen, comprising a plurality of display screens, each of the display screens comprises: a power supply, a controller and a wireless charging and discharging circuit, wherein:
the power supply is configured to power a present display screen, and to provide electric energy to a power supply in another display screen within a first distance; and
the wireless charging and discharging circuit is configured to receive electric energy in form of electromagnetic signal in another display screen, and to provide electric energy of the power supply in form of electromagnetic signal in the present display screen to another display screen;
the controller is configured, in response to that an electric quantity in the power supply of the present display screen is below a first preset threshold, to send wireless charging requests to another display screen within the first distance, to receive electric quantity feedback from another display screen within the first distance, to determine a target display screen according to the electric quantity feedback and a preset selection strategy, and to send charging control information to the target display screen, and to control the wireless charging and discharging circuit in the present display screen to receive electric energy in form of electromagnetic signal provided by the target display screen to provide the electric energy to the power supply in the present display screen;
in response to that the present display screen receives a charging request sent by another display screen, and the electric quantity in the power supply of the present display screen is above a second preset threshold, to provide electric quantity feedback to the controller in the display screen sending the charging request, and in response to that charging control information is received, to control the wireless charging and discharging circuit in the present display screen to provide electric energy of the power supply in the present display screen in form of electromagnetic signal to the display screen sending the charging request;
wherein the controller comprises: an energy patrol circuit, a charging and discharging control circuit, an information receiving circuit, and an information sending circuit, wherein:
the energy patrol circuit is configured to detect in real time the electric quantity of the power supply in the present display screen, and to provide the charging and discharging control circuit with the electric quantity of the power supply;
the information receiving circuit is coupled to the charging and discharging control circuit and configured to receive at least one of the charging request, the charging control information, or the electric quantity feedback sent by another display screen, and to provide the charging and discharging control circuit with at least one of the charging request, the charging control information, or the electric quantity feedback;
the charging and discharging control circuit is coupled to the energy patrol circuit, and configured, in response to that the electric quantity of the power supply in the present display screen is below the first preset threshold, to control the information sending circuit in the present display screen to send the charging request to another display screen within the first distance, to receive the electric quantity feedback from another display screens within the first distance through the information receiving circuit in the present display screen, to determine the target display screen according to the electric quantity feedback and the preset selection strategy, to send the charging control information to the target display screen through the information sending circuit, and to control the wireless charging and discharging circuit in the present display screen to receive electric energy in form of electromagnetic signal provided by the target display screen to provide the electric energy to the power supply in the present display screen; and in response to that the charging request sent by another display screen is received, and the electric quantity in the power supply of the present display screen is above the second preset threshold, to control the information sending circuit in the present display screen to provide the electric quantity feedback to the controller in the display screen sending the charging request, and in response to that the information receiving circuit receives the charging control information, to control the wireless charging and discharging circuit in the present display screen to provide electric energy of the power supply in the present display screen in form of electromagnetic signal to the display screen sending the charging request; and the information sending circuit is coupled to the charging and discharging control circuit and configured to send at least one of the charging requests, the charging control information, or the electric quantity feedback to another display screens within the first distance under the control of the charging and discharging control circuit.

2. The splicing display screen according to claim 1, wherein the charging and discharging control circuit comprises: a charge receiving circuit, a charge transmitting circuit, and a charge transmitting and receiving control circuit, wherein:

the charge transmitting and receiving control circuit is configured, in response to that the charging request provided by the information receiving circuit is received, and the electric quantity of the power supply in the present display screen is above the second preset threshold, to provide the electric quantity feedback to the display screen sending the charging request, and upon reception of the charging control information, to control the charge transmitting circuit in the present display screen to convert electric energy of the power supply in the present display screen to electromagnetic signal and provide the electromagnetic signal to the wireless charging and discharging circuit in the present display screen; and in response to that the electric quantity of the power supply in the present display screen is below the first preset threshold, to control the charge transmitting circuit in the present display screen to send the charging requests to another display screen within the first distance, to receive the electric quantity feedback from another display screens within the first distance, to determine the target display screen according to the electric quantity feedback and the preset selection strategy, to send the charging control information to the target display screen, and to control the charge receiving circuit in the present display screen to convert electromagnetic signal of the target display screen received by the wireless charging and discharging circuit in the present display screen to the electric energy to provide the electric energy to the power supply in the present display screen;

the charge receiving circuit is coupled to the charge transmitting and receiving control circuit and configured to convert the electromagnetic signal received by the wireless charging and discharging circuit to electric signal and provide the electric signal to the power supply in the present display screen, under the control of the charge transmitting and receiving control circuit; and the charge transmitting circuit is coupled to the charge transmitting and receiving control circuit and configured to convert electric signal of the power supply in the present display screen to electromagnetic signal and provide the electromagnetic signal to the wireless charging and discharging circuit under the control of the charge transmitting and receiving control circuit.

3. The splicing display screen according to claim 2, wherein the preset selection strategy comprises determining a display screen of a largest electric quantity as the target display screen within the display screens providing the electric quantity feedback, according to the electric quantity feedback.

4. The splicing display screen according to claim 2, wherein the charging and discharging control circuit further comprises a charging and discharging selecting circuit, wherein:

the charging and discharging selecting circuit is coupled to the energy patrol circuit, the charge receiving control circuit, and the charge transmitting circuit, and configured to set the power supply in a charging mode while the charge receiving circuit is operating, and to set the power supply in a discharging mode while the charge transmitting circuit is operating.

5. The splicing display screen according to claim 2, wherein the wireless charging and discharging circuit comprises a plurality of transmitting and receiving coils located in a bezel of the display screen, and arranged corresponding to the transmitting and receiving coils in another display screen; and the controller controls the transmitting and receiving coils to provide electromagnetic signal to corresponding display screens, or the controller controls the transmitting and receiving coils to receive electromagnetic signal provided by corresponding display screens.

6. The splicing display screen according to claim 5, further comprises a coil selecting circuit, wherein:

the coil selecting circuit is coupled to the charge transmitting and receiving control circuit and configured to determine a transmitting and receiving coil for providing electromagnetic signal to the display screen sending the charging request, under the control of the charge transmitting and receiving control circuit, and to determine a transmitting and receiving coil to receive electromagnetic signal provided by another display screen, under the control of the charge transmitting and receiving control circuit.

7. The splicing display screen according to claim 5, further comprises a plurality of charge transmitting circuits, and a plurality of charge receiving circuits, and each of the transmitting and receiving coils is arranged corresponding respectively to one of the charge transmitting circuits, and one of the charge receiving circuits.

8. The splicing display screen according to claim 5, wherein the transmitting and receiving coils comprise inductive coils.

9. The splicing display screen according to claim 1, wherein both the information receiving circuit and the information sending circuit comprise a wireless communication circuit.

10. The splicing display screen according to claim 1, wherein the first distance is less than 5 mm.

11. A display device, comprising the splicing display screen according to claim 1.

12. A method for powering the splicing display screen according to claim 1, the method comprising:

in response to that the electric quantity of the power supply in the present display screen is below a first preset threshold, sending, by the controller, a wireless charging request to another display screen within the first distance, receiving electric quantity feedback from another display screen within the first distance, determining a target display screen according to the electric quantity feedback and the preset selection strategy, and sending charging control information to the target display screen to control the wireless charging and discharging circuit to receive electric energy provided by the target display screen in form of electromagnetic signal to provide the electric energy to the power supply in the present display screen; and in response to that the present display screen receives a charging request sent by another display screen, and the electric quantity in the power supply in the present display screen is above a second preset threshold, providing electric quantity feedback to the controller in the display screen sending the charging request, and in response to that charging control information is received, controlling the wireless charging and discharging circuit in the present display screen to provide electric energy of the power supply in the present display screen in form of electromagnetic signal to the power supply in the display screen sending the charging request;

wherein, the determining a target display screen according to the electric quantity feedback and the preset selection strategy comprises:

determining a display screen of a largest electric quantity as the target display screen within the display screens providing the electric quantity feedback, according to the electric quantity feedback.

13. The method according to claim 12, wherein, the determining a target display screen according to the electric quantity feedback and the preset selection strategy comprises:

determining a display screen of a largest electric quantity as the target display screen within the display screens providing the electric quantity feedback and having a same distance from the present display screen, according to the electric quantity feedback.

14. The method according to claim 12, wherein, the determining a target display screen according to the electric quantity feedback and the preset selection strategy comprises:

determining a display screen closet to the present display screen as the target display screen within the display screens providing the electric quantity feedback and having same energy quantity, according to the electric quantity feedback.

\* \* \* \* \*